United States Patent
Ando et al.

(10) Patent No.: US 7,934,370 B2
(45) Date of Patent: May 3, 2011

(54) VEHICLE AND CONTROL METHOD THEREOF

(75) Inventors: Ikuo Ando, Toyota (JP); Kazuki Kunishima, Kasugai (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 1068 days.

(21) Appl. No.: 11/651,484

(22) Filed: Jan. 10, 2007

(65) Prior Publication Data

US 2007/0163235 A1 Jul. 19, 2007

(30) Foreign Application Priority Data

Jan. 19, 2006 (JP) ................................ 2006-011024

(51) Int. Cl.
*F01N 3/00* (2006.01)

(52) U.S. Cl. ............... 60/285; 60/274; 60/277; 60/295; 123/198 F; 123/481; 180/65.28; 180/65.29

(58) Field of Classification Search .................. 60/274, 60/276, 277, 285, 297, 295; 123/198 F, 481; 180/65.1–65.4

See application file for complete search history.

(56) References Cited

U.S. PATENT DOCUMENTS

| | | | | |
|---|---|---|---|---|
| 6,405,527 B2* | 6/2002 | Suzuki et al. | ................ | 60/285 |
| 6,408,618 B2* | 6/2002 | Ide | ................ | 60/285 |
| 7,143,577 B2* | 12/2006 | Yoshioka | ................ | 60/285 |
| 7,181,905 B2* | 2/2007 | Surnilla et al. | ................ | 60/285 |
| 7,188,468 B2* | 3/2007 | Fukusako et al. | ................ | 60/285 |
| 7,469,530 B2* | 12/2008 | Fujiwara et al. | ................ | 60/285 |
| 7,614,212 B2* | 11/2009 | Sakai | ................ | 60/285 |
| 7,661,264 B2* | 2/2010 | Takubo | ................ | 60/285 |

FOREIGN PATENT DOCUMENTS

| | | |
|---|---|---|
| JP | A 2000-045922 | 2/2000 |
| JP | A 2000-204996 | 7/2000 |
| JP | A 2004-023959 | 1/2004 |
| JP | B2 3568941 | 6/2004 |
| JP | A-2005-76468 | 3/2005 |
| JP | A 2005-147082 | 6/2005 |
| JP | A-2005-337171 | 12/2005 |

OTHER PUBLICATIONS

Feb. 9, 2010 Office Action issued in Japanese Patent Application No. 2006-011024 (with Translation).

* cited by examiner

*Primary Examiner* — Tu M Nguyen
(74) *Attorney, Agent, or Firm* — Oliff & Berridge, PLC

(57) ABSTRACT

When a vehicle speed V is greater than a threshold value Vref when an engine speed difference $\Delta N$ between an engine speed Ne and a target engine speed Ne* is greater than a threshold value Nref and a catalyst degradation flag Fc is 1, that engine speed Ne is brought to the target engine speed Ne* while the engine is kept firing. However, when the vehicle speed V is less than the threshold value Vref, a fuel cut is executed even if the engine speed difference $\Delta N$ is greater than the threshold value Nref and the catalyst degradation flag Fc is 1. The threshold value Vref is set based on a catalyst bed temperature CT so control to suppress catalyst degradation can be continued for longer the more the operating state is such that the catalyst bed temperature CT is high and degradation of the catalyst is promoted.

8 Claims, 11 Drawing Sheets

VEHICLE AND CONTROL METHOD THEREOF

INCORPORATION BY REFERENCE

The disclosure of Japanese Patent Application No. 2006-011024 filed on Jan. 19, 2006, including the specification, drawings and abstract is incorporated herein by reference in its entirety.

BACKGROUND OF THE INVENTION

1. Field of the Invention

The invention relates to a vehicle and a control method thereof. More specifically, the invention relates to a vehicle having an automatic shutoff function in which the internal combustion engine can be shut off when the vehicle speed detected by vehicle speed detecting means falls into a first low vehicle speed region, as well as to a control method of that vehicle.

2. Description of the Related Art

One known vehicle provided with an internal combustion engine performs control to suppress catalyst degradation in order to suppress degradation of an exhaust gas control catalyst that purifies exhaust gas discharged from the internal combustion engine by prohibiting a fuel cut when the temperature of the exhaust gas control catalyst is in a high temperature region. For example, Japanese Patent Application Publication No. JP-A-2005-147082 describes a vehicle in which, at the start of executing the control to suppress catalyst degradation, the condition for executing that control is a condition in which the vehicle speed is equal to or greater than a predetermined value set in advance. This predetermined value is set to a low vehicle speed at which an occupant is able to smell the sulfurous odor of hydrogen sulfide, which is discharged from the tailpipe when the control to suppress catalyst degradation is executed, in the air around the vehicle. Therefore, when the vehicle speed is less than the predetermined value, priority is given to not subjecting the occupant to the sulfur smell over suppressing catalyst degradation.

In the vehicle having this automatic shutoff function in which the internal combustion engine shuts off in the low vehicle speed region, if the control to suppress catalyst degradation is executed in that low vehicle speed region, the user may feel odd because the internal combustion engine keeps firing (i.e., continues to operate) under conditions in which the internal combustion engine should normally shut off. Accordingly, it is of course possible to prohibit the control to suppress catalyst degradation from being executed when the vehicle speed is less than the predetermined value set in advance, as with the vehicle described in Japanese Patent Application Publication No. JP-A-2005-147082, but in this case, even though the user would feel less odd, degradation of the catalyst would not be suppressed, which may shorten the life of the catalyst.

SUMMARY OF THE INVENTION

This invention thus aims to provide a vehicle and a control method thereof which both avoids catalyst degradation and reduces the degree to which the user feels odd.

A first aspect of the invention relates to a vehicle including: a vehicle speed detecting device that detects a vehicle speed; an automatic shutoff apparatus that shuts off an internal combustion engine when the vehicle speed is in a first low vehicle speed region; an exhaust gas control catalyst that purifies exhaust gas discharged from the internal combustion engine; a fuel injection apparatus that injects fuel into the internal combustion engine; and a control apparatus which, i) when a predetermined catalyst degradation condition is satisfied when a predetermined fuel cut condition is satisfied, executes control to suppress catalyst degradation that keeps the internal combustion engine firing without the fuel injection apparatus cutting off the injection of fuel when the vehicle speed detected by the vehicle speed detecting device is outside of a second low vehicle speed region set based on an operating state of the vehicle, and ii) executes fuel cut control that stops the internal combustion engine from firing by the fuel injection apparatus cutting off the injection of fuel when the vehicle speed detected by the vehicle speed detecting apparatus is in the second low vehicle speed region while the control to suppress catalyst degradation is being executed.

In the vehicle according to this aspect, when both the fuel cut condition and the catalyst degradation condition are satisfied, control to suppress catalyst degradation is executed when the vehicle speed is outside of the second low vehicle speed region. On the other hand, when the vehicle speed is in the second low vehicle speed region, a fuel cut is executed even if both the fuel cut condition and the catalyst degradation condition are satisfied and the control to suppress catalyst degradation is being executed. That is, in a vehicle having an automatic shutoff function which shuts off the internal combustion engine in the first low vehicle speed region, it may strike the user odd if the internal combustion engine keeps firing (i.e., operating) even though the vehicle speed is low, so the internal combustion engine is shutoff (i.e., stopped) in the second low vehicle speed region. At this time, the second vehicle speed region is set based on the operating state of the vehicle. Therefore, by setting the second vehicle speed region to be lower when the vehicle is operating in a state that greatly promotes degradation of the exhaust gas control catalyst than when the vehicle is operating in a state that promotes degradation of the exhaust gas control catalyst at a slower rate, for example, control to suppress catalyst degradation is able to be continued for longer. Therefore, the odd sensation imparted to the user is able to be reduced and catalyst degradation is able to be avoided.

Here, the first low vehicle speed region and the second vehicle speed region may be the same vehicle speed region or different vehicle speed regions. Also, the predetermined fuel cut condition may be set as appropriate. For example, the predetermined fuel cut condition may be a condition in which the driver is depressing the brake pedal after releasing the accelerator pedal when driving. Also, the predetermined catalyst degradation condition may be a condition in which, for example, the exhaust gas control catalyst is in a high temperature region in which it will tend to degrade if exposed to an oxygen rich atmosphere that would result if a fuel cut were executed. Further, the control apparatus may be formed of one or two or more control units.

In the vehicle according to this aspect, a parameter relating to the operating state of the vehicle may include a temperature of the exhaust gas control catalyst. Accordingly, the vehicle speed region in which a fuel cut is executed is set based on the temperature of the exhaust gas control catalyst so the second low vehicle speed region can be set taking into account the tendency of catalyst degradation. At this time, the control apparatus may set the second low vehicle speed region such that an upper limit value thereof decreases the higher the temperature of the exhaust gas control catalyst. Accordingly, because higher exhaust gas control catalyst temperatures tend to promote catalyst degradation more, the internal combustion engine can be made to keep firing until a lower vehicle speed the higher the temperature of the exhaust gas control catalyst.

The vehicle according to this aspect may also include an electric power/power input/output apparatus, an electric motor, and a power storing device. The electric power/power input/output apparatus is connected to a driveshaft and an output shaft of the internal combustion engine, and outputs at least some power from the internal combustion engine to the driveshaft with the input/output of power and electric power. The electric motor selectively inputs and outputs power to and from the driveshaft. The power storing device selectively supplies and receives electric power to and from the electric power/power input/output apparatus and the electric motor. Also, a parameter relating to the operating state of the vehicle may include a state of the power storing device. Accordingly, the second low vehicle speed region in which a fuel cut is executed is set based on the state of the power storing device. Therefore, the second low vehicle speed region can be set taking into account the transfer of power between the power storing device and the electric power/power input/output apparatus, as well as between the power storing device and the electric motor. At this time, the state of the power storing device may be a state-of-charge of the power storing device, and the control apparatus may set the second low vehicle speed region such that an upper limit value thereof decreases the lower the state-of-charge of the power storing device. The supply of power from the power storing device to the electric power/power input/output apparatus and the supply of power from the power storing device to the electric motor are limited the lower the state-of-charge of the power storing device. Therefore, the internal combustion engine may be kept firing until a lower vehicle speed the lower the state-of-charge of the power storing device. Also, the state of the power storing device may be a temperature of the power storing device, and the control apparatus may set the second low vehicle speed region such that an upper limit value thereof decreases the more limited an electric power supply amount from the power storing device which is set according to the temperature of the power storing device. The supply of power from the power storing device to the electric power/power input/output apparatus and the supply of power from the power storing device to the electric motor are limited according to the temperature of the power storing device. Therefore, the second low vehicle speed region may be set according to the temperature of the power storing device. Also, the electric power/power input/output apparatus may include a three-shaft power input/output apparatus and an electric motor. The three-shaft power input/output apparatus is connected to three shafts, one of which is a rotating shaft, another of which is the driveshaft, and yet another of which is an output shaft of the internal combustion engine, and, based on the power input/output to/from any two shafts of the three shafts, selectively inputs and outputs power to and from the remaining shaft. The electric motor selectively inputs and outputs power to and from the rotating shaft.

A second aspect of the invention relates to a control method of a vehicle that includes an internal combustion engine, an exhaust gas control catalyst that purifies exhaust gas discharged from the internal combustion engine, fuel injecting means for injecting fuel into the internal combustion engine, vehicle speed detecting means for detecting a vehicle speed, and automatic shutting off means for shutting off the internal combustion engine when the vehicle speed detected by the vehicle speed detecting means is in a first low vehicle speed region. This control method includes the steps of i) when a predetermined catalyst degradation condition is satisfied when a predetermined fuel cut condition is satisfied, executing control to suppress catalyst degradation that keeps the internal combustion engine firing without cutting off the injection of fuel by the fuel injecting means when the vehicle speed detected by the vehicle speed detecting means is outside of a second low vehicle speed region set based on an operating state of the vehicle, and ii) executing fuel cut control that stops the internal combustion engine from firing by cutting off the injection of fuel by the fuel injecting means when the vehicle speed detected by the vehicle speed detecting means is in the second low vehicle speed region while the control to suppress catalyst degradation is being executed.

In the control method of a vehicle according to this aspect, when the catalyst degradation condition is satisfied when the fuel cut condition is satisfied, control to suppress catalyst degradation is executed when the vehicle speed is outside of the second low vehicle speed region. On the other hand, when the vehicle speed is in the second low vehicle speed region, a fuel cut is executed even if the catalyst degradation condition is satisfied when the fuel cut condition is satisfied and the control to suppress catalyst degradation is being executed. That is, in a vehicle having an automatic shutoff function which shuts off the internal combustion engine in the first low vehicle speed region, it may strike the user odd if the internal combustion engine keeps firing (i.e., operating) even though the vehicle speed is low, so the internal combustion engine is shutoff (i.e., stopped) in the second low vehicle speed region. At this time, the second vehicle speed region is set based on the operating state of the vehicle. Therefore, by setting the second vehicle speed region to be lower when the vehicle is operating in a state that greatly promotes degradation of the exhaust gas control catalyst than when the vehicle is operating in a state that promotes degradation of the exhaust gas control catalyst at a slower rate, for example, control to suppress catalyst degradation is able to be continued for longer. Therefore, the odd sensation imparted to the user is able to be reduced and catalyst degradation is able to be avoided.

The control method of a vehicle according to the second aspect may also include a step(s) for realizing the operation and function displayed by the structure of the vehicle according to the first aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments.

Figure 1:
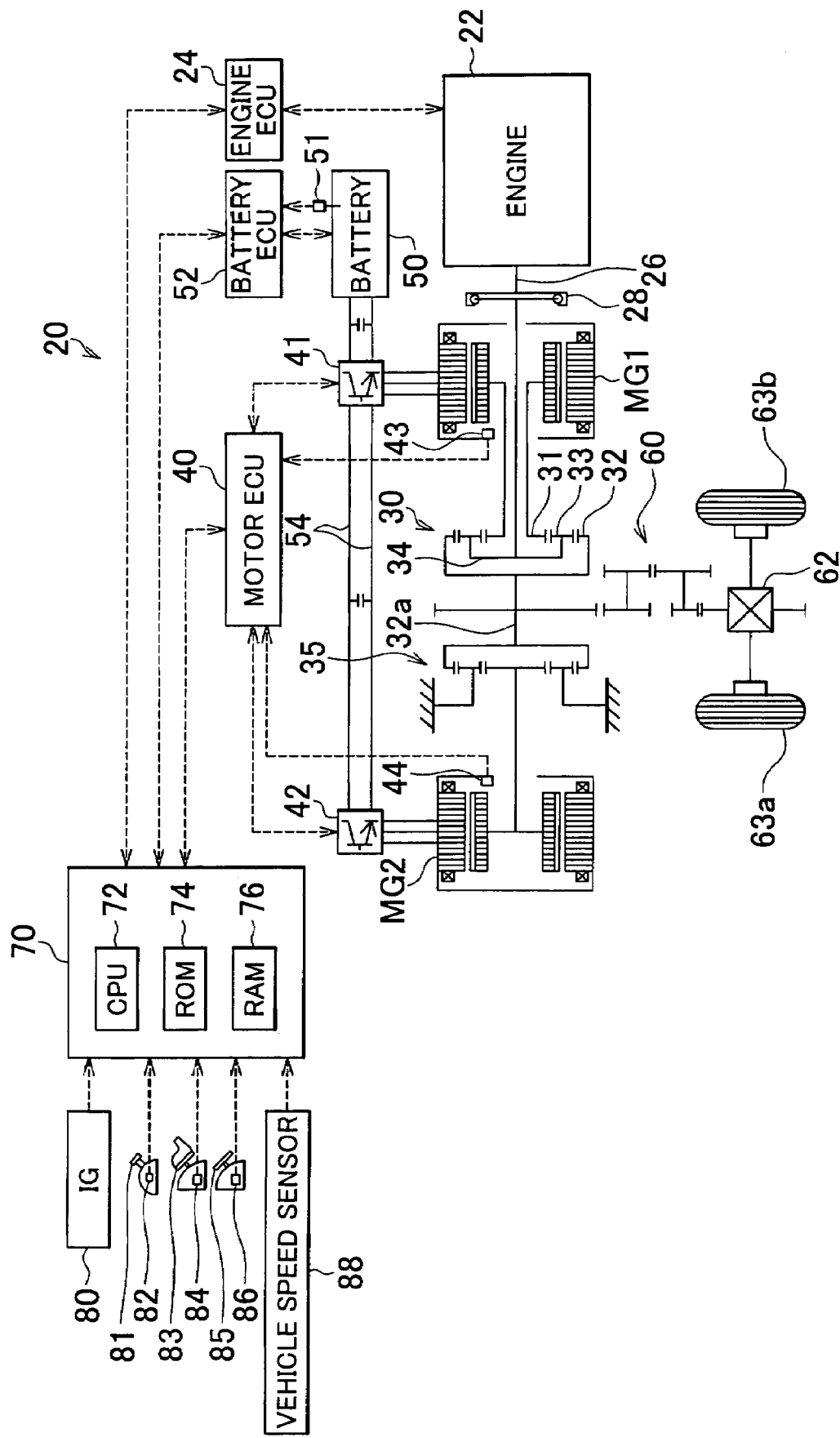
FIG. 1 is a block diagram schematically showing the structure of a hybrid vehicle according to one example embodiment of the invention.

FIG. 1 is a block diagram schematically showing the structure of a hybrid vehicle 20 according to one example embodiment of the invention. As shown in the drawing, the hybrid vehicle 20 according to this example embodiment includes an engine 22, a power split device 30 in which a carrier 34 thereof that rotates pinion gears 33 is connected via a damper 28 to a crankshaft 26 that serves as an output shaft of the engine 22, a motor MG1 capable of generating energy which is connected to a sun gear 31 of the power split device 30, a motor MG2 which is connected via a reduction gear 35 to a ring gear shaft 32a which serves as a driveshaft that is connected to a ring gear 32 of the power split device 30, and a hybrid electronic control unit (hereinafter referred to as "hybrid ECU") 70 that controls the entire hybrid vehicle 20. The ring gear shaft 32a which serves as the driveshaft is connected to driven wheels 63a and 63b via the gear mechanism 60 and the differential gear 62. Power output to the ring gear shaft 32a is used as power for driving the vehicle.

Figure 2:
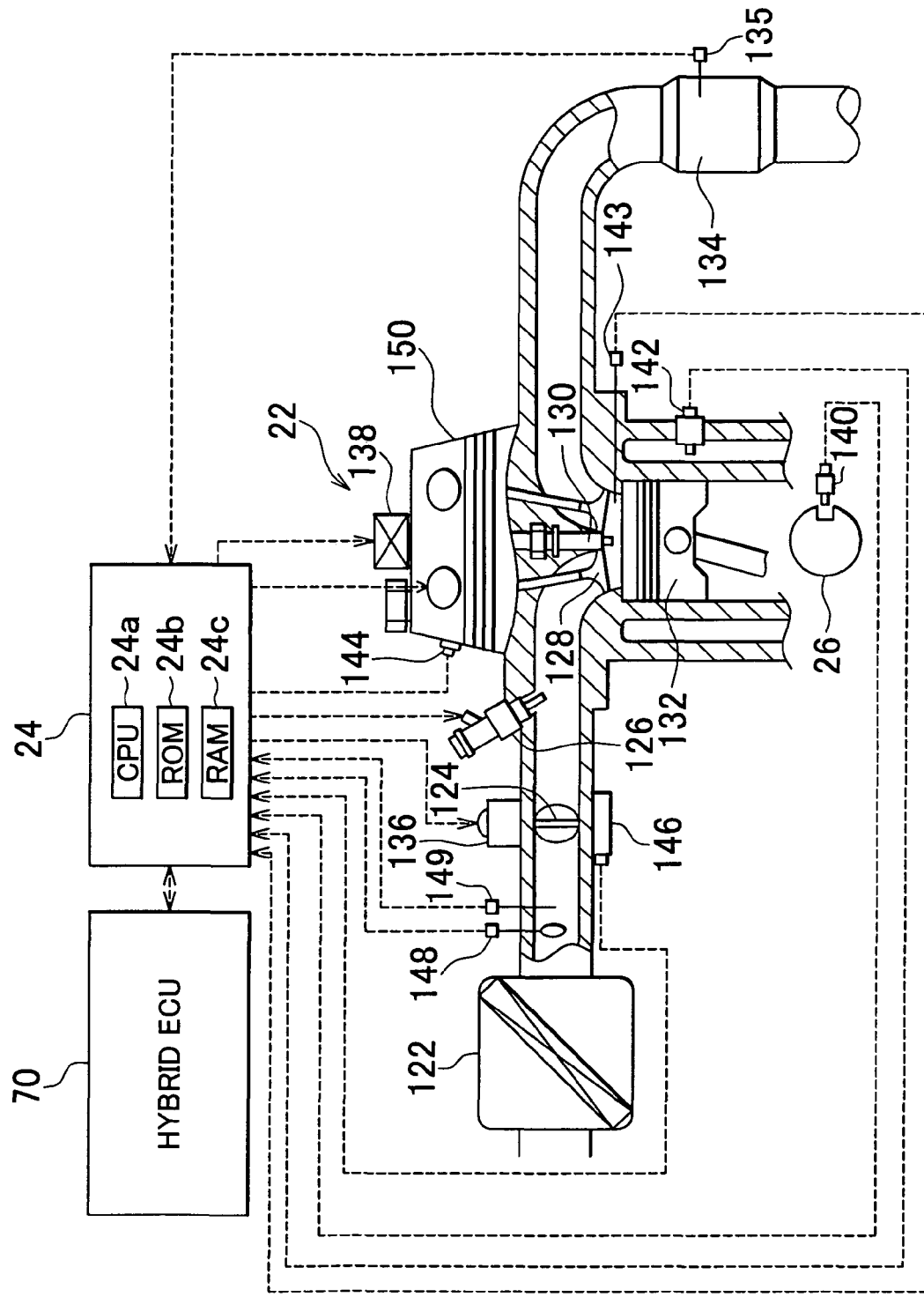
FIG. 2 is a block diagram schematically showing the structure of an engine in the hybrid vehicle shown in FIG. 1.

The engine 22 is an internal combustion engine that can output power by burning a hydrocarbon fuel such as gasoline or gas oil. As shown in FIG. 2, the engine 22 draws in air that has been cleaned by an air cleaner 122 through a throttle valve 124 and injects gasoline from a fuel injection valve 126. The injected gasoline mixes with the air that is drawn in to create an air-fuel mixture which is then drawn into a combustion chamber through an intake valve 128. In the combustion chamber, the air-fuel mixture is ignited by an electric spark produced by a spark plug 130 and combusted. The resultant energy produced by the combustion forces a piston 132 downward and the reciprocal motion of the piston 132 is converted into rotary motion of the crankshaft 26. Exhaust from the engine 22 is discharged outside through an exhaust gas control apparatus (i.e., a three-way catalyst) that purifies carbon monoxide (CO), hydrocarbons (HC), and nitrogen oxides (NOx) which are toxic components.

The engine 22 is controlled by an engine electronic control unit (hereinafter simply referred to as "engine ECU") 24. The engine ECU 24 is formed as a microprocessor that is centered around a CPU 24a. In addition to the CPU 24a, the engine ECU 24 also includes ROM 24b that stores processing programs, RAM 24c that temporarily stores data, and input/output ports and a communication port, not shown. Various signals are input via the input port to the engine ECU 24 from various sensors that detect the state of the engine 22. Some of these signals include, for example, a signal indicative of the crankshaft position from a crankshaft position sensor 140 that detects the rotational position of the crankshaft 26, a signal indicative of the coolant temperature from a coolant temperature sensor 142 that detects the temperature of coolant in the engine 22, a signal indicative of catalyst bed temperature CT from a temperature sensor 135 mounted to the exhaust gas control apparatus 134, a signal indicative of in-cylinder pressure from a pressure sensor 143 mounted inside the combustion chamber, and a signal indicative of the cam position from a cam position sensor 144 that detects the rotational position of a camshaft that opens and closes the intake valve 128 that draws the air-fuel mixture into the combustion chamber and an exhaust valve that discharges exhaust gas from the combustion chamber. Other signals input via the input port to the engine ECU 24 include a signal indicative of the throttle position from a throttle valve position sensor 146 that detects the position of a throttle valve 124, an airflow meter signal from an airflow meter 148 mounted to an intake pipe, and a signal indicative of the intake air temperature from a temperature sensor 149 mounted to the same intake air pipe. Various control signals for driving the engine 22 are also output from the engine ECU 24 via the output port. Some of these signals include, for example, a drive signal output to a fuel injection valve 126, a drive signal output to a throttle motor 136 that adjusts the position of the throttle valve 124, a control signal output to an ignition coil 138 which is integrated with an igniter, and a control signal output to a variable valve timing mechanism 150 that can change the opening and closing timings of the intake valve 128. The engine ECU 24 communicates with the hybrid ECU 70 and controls the operation of the engine 22 according to control signals from the hybrid ECU 70, as well as outputs data related to the operating state of the engine to the hybrid ECU 70 when necessary.

The power split device 30 is formed by a planetary gear set which includes a sun gear 31 with external teeth, a ring gear 32 with internal teeth which is arranged on the same axis as the sun gear 31, a plurality of pinion gears 33 which are in mesh with both the sun gear 31 and the ring gear 32, and a carrier 34 which rotatably and revolvably retains the plurality of pinion gears 33. The power split device 30 uses the sun gear 31, the ring gear 32, and the carrier 34 as rotating elements to perform a differential operation. This power split device 30 is structured such that the carrier 34 is connected to the crankshaft 26 of the engine 22, the sun gear 31 is connected to the motor MG1, and the ring gear 32 is connected via the ring gear shaft 32a to the reduction gear 35. The power split device 30 distributes power from the engine 22 that is input from the carrier 34 to both the sun gear 31 and the ring gear 32 at the corresponding gear ratio when the motor MG1 functions as a generator, and combines the power from the engine 22 input from the carrier 34 with the power from the MG1 input from the sun gear 31 and outputs the combined power to the ring gear 32 when the motor MG1 functions as an electric motor. The power output to the ring gear 32 is ultimately output from the ring gear shaft 32a to driven wheels 63a and 63b of the vehicle via a gear mechanism 60 and a differential gear 62.

The motor MG1 and the motor MG2 are both structured as known synchronous motor-generators capable of operating either as a generator or as an electric motor, and transfer electric power to and from a battery 50 via inverters 41 and 42. The driving of both of these motors MG1 and MG2 is controlled by a motor electronic control unit (hereinafter simply referred to as "motor ECU") 40. This motor ECU 40 receives various signals necessary to control the driving of the motors MG1 and MG2. Some of these signals include, for example, signals from rotational position detecting sensors 43 and 44 that detect the rotational positions of the rotors of the motors MG1 and MG2, and signals indicative of the phase current applied to the motors MG1 and MG2 detected by current sensors, not shown. The motor ECU 40 also outputs switching control signals to the inverters 41 and 42. The motor ECU 40 communicates with the hybrid ECU 70 and controls the driving of the motors MG1 and MG2 according to control signals from the hybrid ECU 70, as well as outputs data relating to the operating state of the motors MG1 and MG2 to the hybrid ECU 70 as necessary.

The battery 50 is controlled by a battery electronic control unit (hereinafter simply referred to as "battery ECU") 52. The battery ECU 52 receives various signals necessary to control the battery 50. Some of these signals include, for example, a signal indicative of the voltage between terminals from a voltage sensor, not shown, arranged between the terminals of the battery 50, a signal indicative of the charge and discharge of current from a current sensor, not shown, attached to a power line 54 that is connected to an output terminal of the battery 50, and a signal indicative of the battery temperature Tb from a temperature sensor 51 attached to the battery 50. The battery ECU 52 calculates the state-of-charge (SOC) for controlling the battery 50, as well as calculates input/output limits Win and Wout from the calculated SOC and the battery temperature Tb, and the charge and discharge required power Pb* which is the value required to charge and discharge the battery 50. The battery ECU 52 outputs the data to the hybrid ECU 70 as necessary through communication.

The hybrid ECU 70 is formed as a microprocessor that centers around a CPU 72. In addition to the CPU 72, the hybrid ECU 70 also includes ROM 74 that stores processing programs, RAM 76 that temporarily stores data, and input/output ports and a communication port, not shown. The hybrid ECU 70 receives various signals via the input port. Some of these signals include, for example, an ignition signal from an ignition switch 80, a signal indicative of a shift position SP from a shift position sensor 82 that detects the operating position of a shift lever 81, a signal indicative of the accelerator depression amount Acc from an accelerator pedal position sensor 84 that detects the depression amount of an accelerator pedal 83, a signal indicative of a brake pedal position BP from a brake pedal position sensor 86 that detects the depression amount of a brake pedal 85, and a signal indicative of the vehicle speed V from a vehicle speed sensor 88. The hybrid ECU 70 is also connected via the communication port to the engine ECU 24, the motor ECU 40, and the battery ECU 52, as described above, and various control signals and data are transmitted back and forth between the hybrid ECU 70 and the engine ECU 24, the motor ECU 40, and the battery ECU 52.

The hybrid vehicle 20 according to this example embodiment having the foregoing structure calculates the torque needed to be output to the ring gear shaft 32a, which serves as the driveshaft, based on the vehicle speed V and the accelerator depression amount Acc that corresponds to the depression amount of the accelerator pedal 83 by the driver. The engine 22, the motor MG1, and the motor MG2 are then controlled such that the required power corresponding to that required torque is output to the ring gear shaft 32a. The engine 22, the motor MG1, and the motor MG2, are controlled in one of three operating modes, for example, i.e., a torque converted operating mode, a charge-and-discharge operating mode, and a motor operating mode. The torque converted operating mode is a mode which both controls the operation of the engine 22 so that it outputs power corresponding to the required power, as well as controls the motors MG1 and MG2 so that all of the power output from the engine 22 is converted into torque by the power split device 30, the motor MG1, and the motor MG2, and then output to the ring gear shaft 32a. The charge-and-discharge operating mode is a mode which both controls the operation of the engine 22 so that it outputs power corresponding to the sum of the required power and the power necessary to charge and discharge the battery 50, as well as controls the motors MG1 and MG2 so that the required power is output to the ring gear shaft 32a with all or some of the power output from the engine 22 being converted into torque by the power split device 30, the motor MG1, and the motor MG2 with charging and discharging of the battery 50. The motor operating mode is a mode which stops operation of the engine 22 and controls the motor MG2 to output power corresponding to the required power to the ring gear shaft 32a. In this example embodiment, when the engine is running under a light load of equal to or less than an EV running allowable vehicle speed Vev (such as equal to or less than 55 km/h) the vehicle is allowed to run in the motor operating mode when another condition, such as a condition regarding the state-of-charge (SOC) of the battery 50, is satisfied.

Figure 3A:
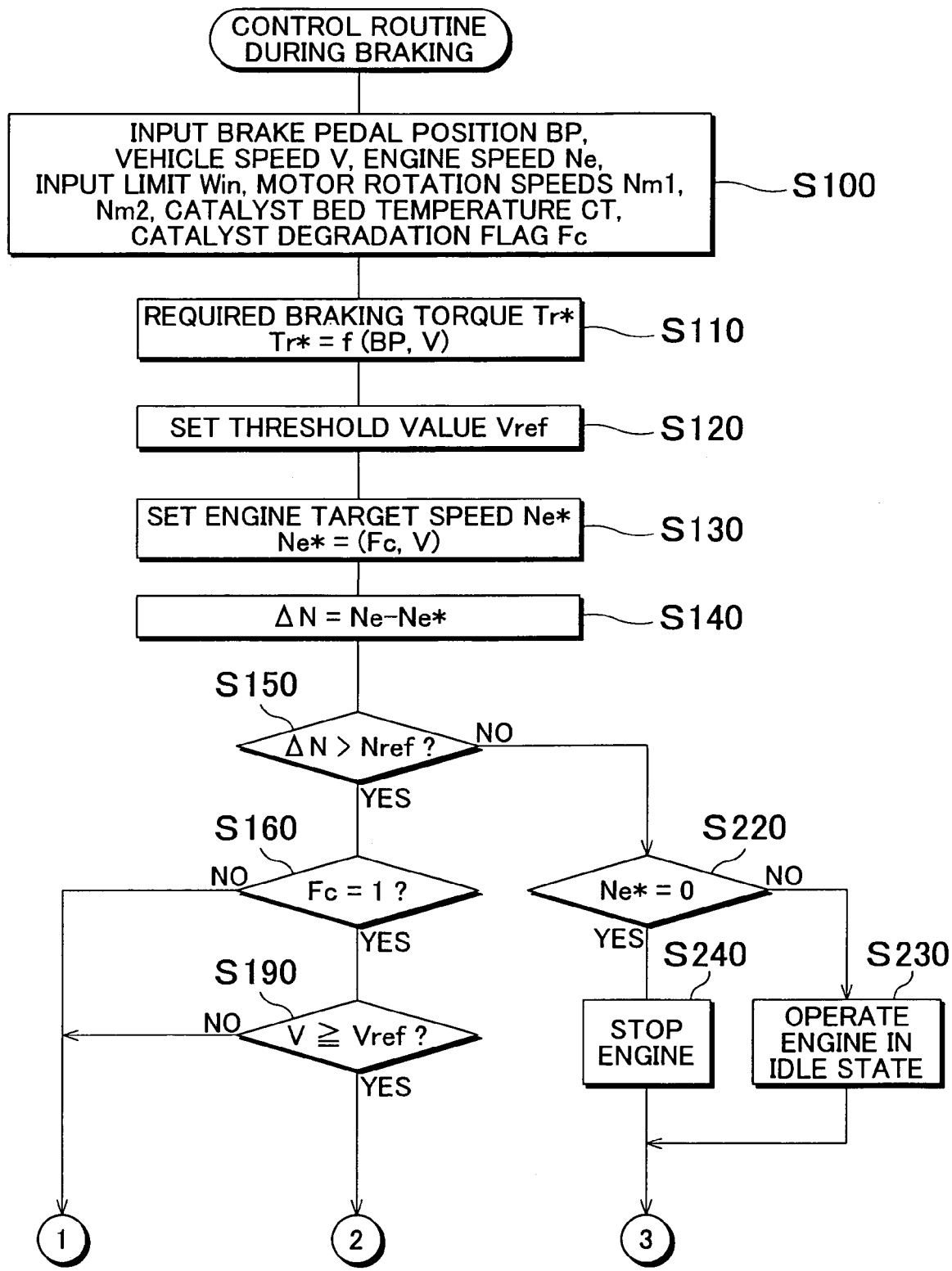
FIGS. 3A, 3B are flowcharts illustrating one example of a control routine during braking.
Figure 3B:
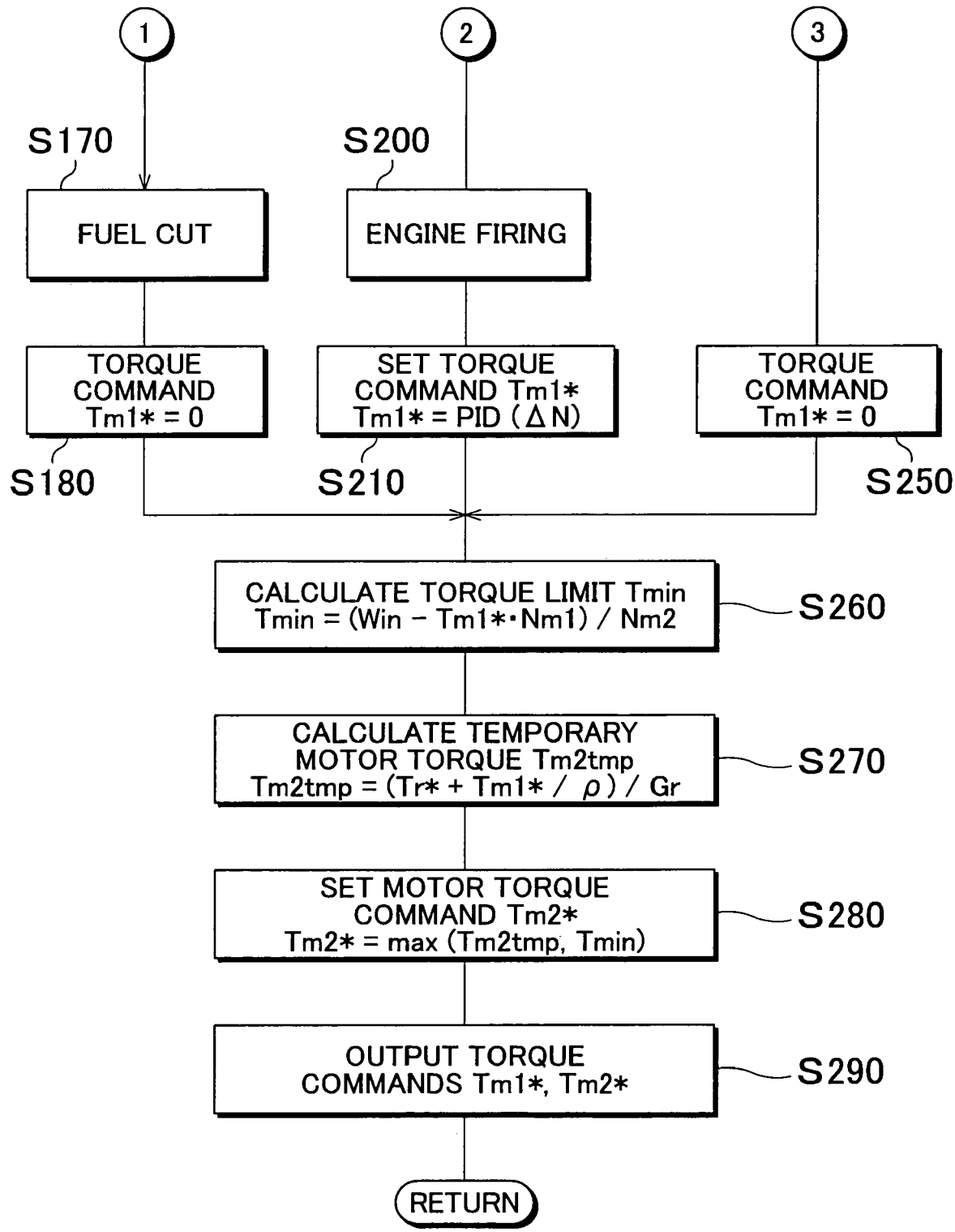

Next, operation of the hybrid vehicle 20 according to this example embodiment will be described. More specifically, operation when control to suppress catalyst degradation is executed when the driver has released the accelerator pedal 83 or depressed the brake pedal 85 such that braking force is applied and a light load is placed on the engine while a catalyst degradation condition is satisfied by an increase in the catalyst bed temperature CT of the exhaust gas control apparatus 134 will be described. Here in this example embodiment, the control to suppress catalyst degradation is control which is executed to suppress degradation of the catalyst caused by oxygen in the air that would be supplied to the exhaust gas control apparatus 134 if a fuel cut were executed, by prohibiting a fuel cut of the engine 22 when the catalyst bed temperature CT is, high. That is, control is executed to supply fuel to the engine 22 and generate a spark (i.e., firing) even if power is not required from the engine 22 because the vehicle is being braked or only a small amount of power is required by the vehicle. FIGS. 3A, 3B are flowcharts illustrating a control routine during braking which is executed by the hybrid ECU 70 as one example of drive control during braking of the vehicle which includes this kind of control to suppress catalyst degradation. This routine is repeatedly executed at predetermined intervals of time (such as every several msec).

When the control routine during braking is executed, the CPU 72 of the hybrid ECU 70 first performs a step of inputting data necessary for that control, e.g., the brake pedal position BP from the brake pedal position sensor 86, the vehicle speed V from the vehicle speed sensor 88, the speed Ne of the engine 22 (hereinafter simply referred to as "engine speed Ne"), the input limit Win of the battery 50, the rotation speeds Nm1 and Nm2 of the motors MG1 and MG2, respectively, the catalyst bed temperature CT, and the catalyst degradation flag Fc and the like (step S100). Here, the catalyst degradation flag Fc is a flag that indicates whether the catalyst bed temperature CT of the exhaust gas control apparatus 134 is in a predetermined high temperature region (such as equal to or greater than 750 degrees Celsius) in which catalyst degradation tends to occur due to a fuel cut of the engine 22 being executed. When the catalyst degradation flag Fc is 0, it indicates that the catalyst bed temperature CT is less than the predetermined high temperature region. When the catalyst degradation flag Fc is 1, it indicates that the catalyst bed temperature CT is in the predetermined high temperature region. This catalyst degradation flag Fc is input after being set according to a routine for setting a catalyst degradation suppression flag, not shown, which is executed by the engine ECU 24. Also, the engine speed Ne is calculated based on the signal from the crankshaft position sensor 140 that is mounted on the crankshaft 26, and input from the engine ECU 24 through communication. Also, the rotation speeds Nm1 and Nm2 of the motors MG1 and MG2 are calculated based on the rotational positions of the rotors of the motors MG1 and MG2 detected by the rotational position detecting sensors 43 and 44, and are input from the motor ECU 40 through communication. The input limit Win of the battery 50 is set based on the SOC of the battery 50 and input from the battery ECU 52 through communication.

Figure 4:
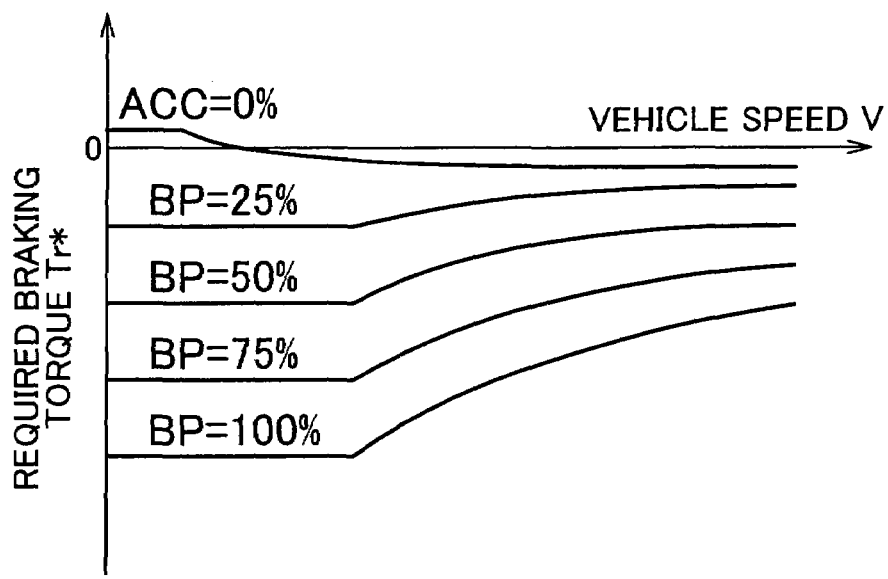
FIG. 4 is a view illustrating one example of a map used for setting required braking torque.

Once this data is input, the CPU 72 sets the required braking torque Tr* to be output as braking torque required by the vehicle to the ring gear shaft 32a which serves as the driveshaft and is connected to the driven wheels 63a and 63b, based on the vehicle speed V and the brake pedal position BP that are input (step S110). In this example embodiment, the relationship between the brake pedal position BP, the vehicle speed V, and the required braking torque Tr* is set and stored in the ROM 74 in advance in the form of a map for setting the required braking torque. The CPU 72 derives the corresponding required braking torque Tr* from the stored map when the brake pedal position BP and the vehicle speed V are applied and sets it. FIG. 4 shows one example of the map for setting the required braking torque.

Figure 5:
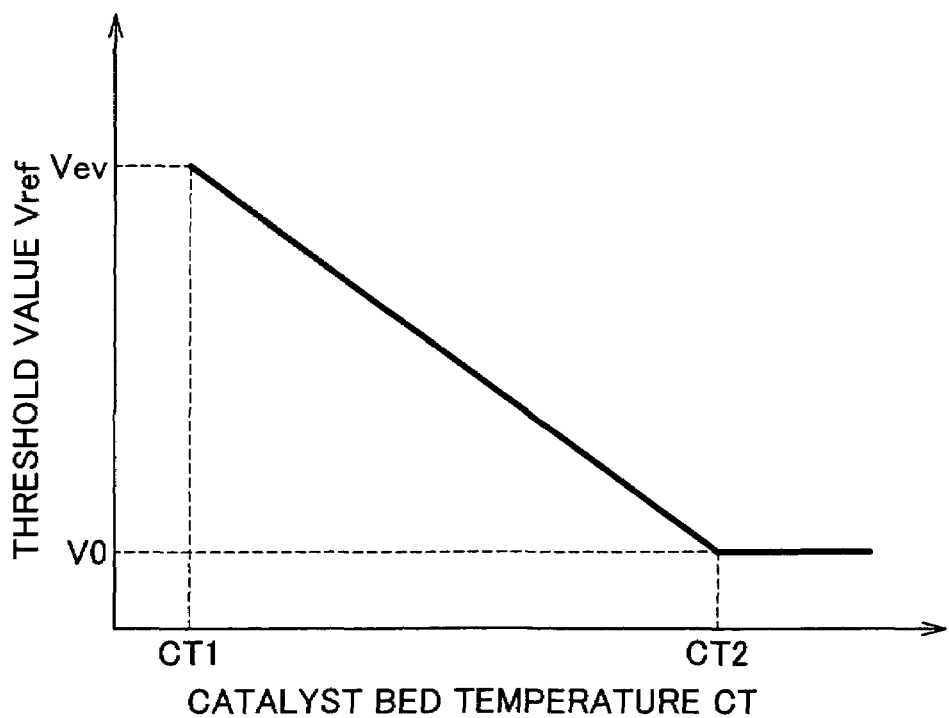
FIG. 5 is a view illustrating one example of a map used for setting a threshold.

Continuing on, the CPU 72 sets a threshold value Vref based on the catalyst bed temperature CT that was input (step S120). The threshold value Vref indicates a lower limit value of the vehicle speed region at which the engine 22 will continue to operate (fire), according to control to suppress catalyst degradation. In this example embodiment, the relationship between the threshold value Vref and the catalyst bed temperature CT is set and stored in advance in the ROM 74 as a map for setting a threshold value. When the catalyst bed temperature CT is applied to the map, the corresponding threshold value Vref is then derived from the map and set. FIG. 5 shows one example of the map for setting a threshold value. As shown in the drawing, in this map for setting a threshold value, the threshold value Vref is set to a maximum value at temperature CT1, then decrease closer to temperature CT2 which is higher than temperature CT1, and is a minimum value at or above temperature CT2. Here, the temperature CT1 is the lower limit of the predetermined high temperature region in which the catalyst tends to degrade when a fuel cut of the engine 22 is executed. The temperature CT 2 is the lower limit of the temperature region in which the catalyst tends to degrade extremely readily. Also, the maximum value of the threshold Vref is the EV running allowable vehicle speed Vev and the minimum value of the threshold value Vref is a value V0 (such as 3 km/h or 5 km/h) that slightly exceeds 0.

Once the threshold value Vref is set, the CPU 72 then sets a target speed Ne* of the engine 22 (hereinafter referred to simply as "target engine speed Ne*") (step S130). For example, when the catalyst degradation flag Fc is 0 (i.e., there is no need for control to suppress catalyst degradation), the target engine speed Ne* may be set to 0 in order to stop (i.e., shutoff) the engine 22 regardless of the threshold Vref. When the catalyst degradation flag Fc is 1 (i.e., there is a need for control to suppress catalyst degradation) and the vehicle speed is equal to or greater than the threshold value Vref, the target engine speed Ne* may be set to a predetermined speed (such as 800 or 1000 rpm). When the catalyst degradation flag Fc is 1 (i.e., there is a need for control to suppress catalyst degradation) and the vehicle speed is less than the threshold value Vref, the target engine speed Ne* may be set to zero.

Then the CPU 72 calculates an engine speed difference ΔN between the engine speed Ne that was input and the target engine speed Ne* that was set (step S140), and compares that calculated engine speed difference ΔN with a threshold value Nref (step S150). Here, the threshold value Nref is an engine speed difference from a target engine speed Ne* that the engine 22 can easily reach without actively controlling the engine speed Ne using the motor MG1. This threshold value Nref is set as a relatively low value.

Figure 6:
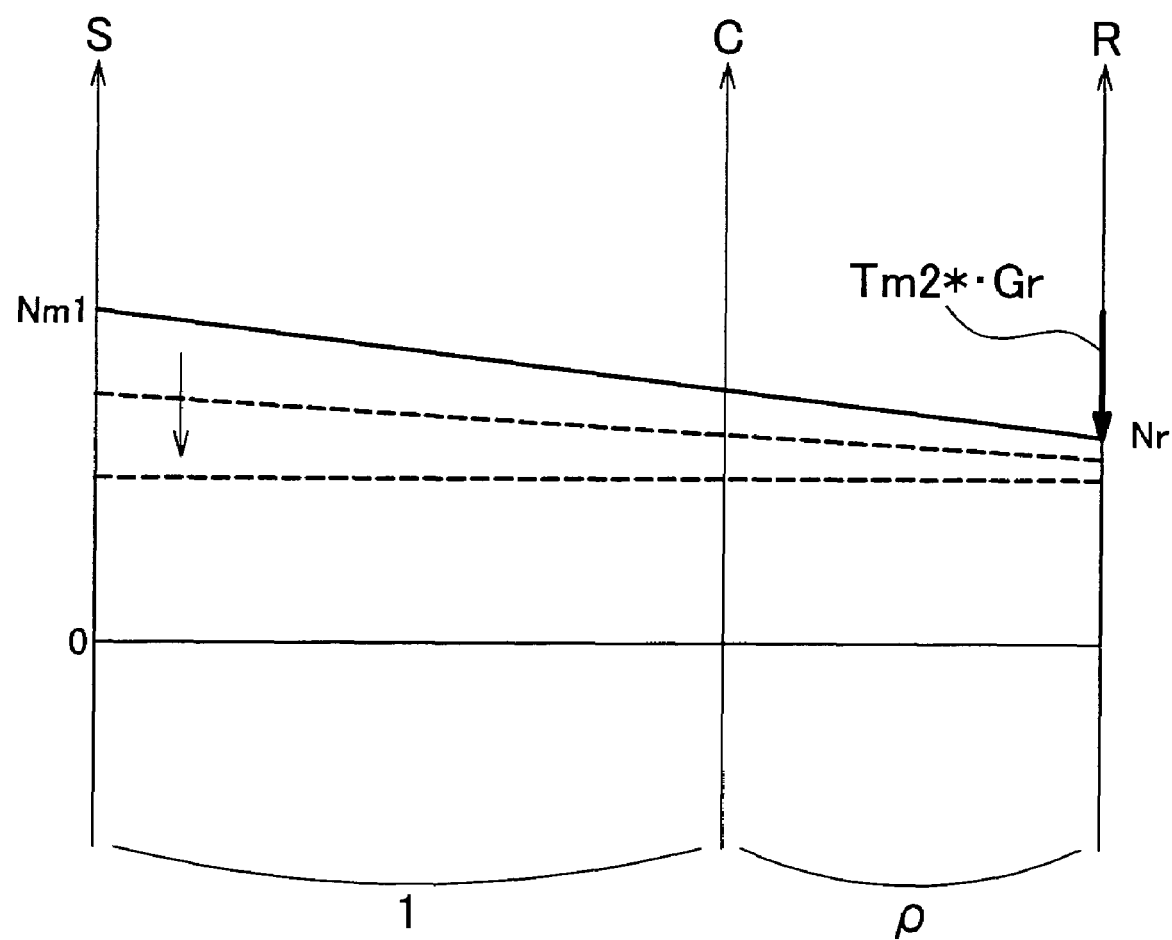
FIG. 6 is a view of one example of an alignment graph showing the mechanical relationship between torque and rotation speed of rotating elements of a power split device.

Now, let us assume that the driver has depressed the accelerator pedal 83 so that the engine 22 is operating at a relatively high speed and the vehicle speed V is relatively high, and then lets off of the accelerator pedal 83 and lightly depresses the brake pedal 85. In this case, a relatively low predetermined speed is set for the target engine speed Ne* so the engine speed difference ΔN is larger than the threshold value Nref. Therefore, it is determined that the fuel cut condition in which the supply of fuel to the engine 22 is temporarily stopped is satisfied. In this case, it is next determined whether the catalyst degradation suppression flag Fc is 1 (step S160). When the catalyst degradation suppression flag Fc is 0, i.e., when the catalyst bed temperature CT is not in the predetermined high temperature region, control is not necessary to suppress catalyst degradation so the CPU 72 outputs a command to the engine ECU 24 to execute a fuel cut (step S170), and sets a torque command Tm1* for the motor MG1 to 0 (step S180). More specifically, the fuel cut is performed by the CPU 72 sending a control signal to perform a fuel cut to the engine ECU 24 and the engine ECU 24 then stopping fuel injection and ignition upon receiving that control signal. Once the torque command Tm1* for the motor MG1 is calculated in this manner, a torque limit Tmin is calculated according to Expression (1) below as a lower limit of torque that may be output from the motor MG2. This torque limit Tmin is calculated by dividing the difference between the input limit Win of the battery 50 and the consumed power (generated power) of the motor MG1 by the rotation speed Nm2 of the motor MG2 (step S260). Incidentally, the consumed power (generated power) of the motor MG1 is obtained by multiplying the calculated torque command Tm1* (in this case, 0) of the motor MG1 by the current rotation speed Nm1 of the motor MG1. In addition, a temporary motor torque Tm2tmp is calculated as torque to be output from the motor MG2 according to Expression (2) below using the required braking torque Tr*, the torque command Tm1*, and the gear ratio ρ of the power split device 30 (step S270). A torque command Tm2* of the motor MG2 is then set as a value that limits the temporary motor torque Tm2tmp by the calculated torque limit Tmin (step S280), and the set torque commands Tm1* and Tm2* are then output to the motor ECU 40 (step S290), after which this cycle of the routine ends. Upon receiving the torque commands Tm1* and Tm2*, the motor ECU 40 switches switching elements in the inverters 41 and 42 to drive the motors MG1 and MG2 according to the torque commands Tm1* and Tm2*. FIG. 6 shows an example of an alignment graph illustrating the mechanical relationship between torque and rotation speed of the rotating elements of the power split device 30 during braking following a fuel cut of the engine 22. In the drawing, the S axis on the left represents the rotation speed of the sun gear 31 which is the rotation speed Nm1 of the motor MG1, the C axis in the middle represents the rotation speed of the carrier 34 which is the same as the engine speed Ne, and the R axis on the right represents the rotation speed Nr of the ring gear 32 which is the rotation speed Nm2 of the motor MG2 divided by the gear ratio Gr of the reduction gear 35. The bold arrow on the R axis indicates torque acting on the ring gear shaft 32a when the motor MG2 is driven using the torque command Tm2*. Also in the drawing, the solid line is collinear when the brake pedal 85 is being depressed, and the broken lines indicate the collinear change over the time. As shown in the drawing, the engine speed Ne decreases as a result of the fuel cut. Expression (2) can easily be derived from this alignment graph.

$$T\min=(Win-Tm1^* \cdot Nm1)/Nm2 \quad (1)$$

$$Tm2tmp=(Tr^*+Tm1^*/\rho)/Gr \quad (2)$$

Figure 7:
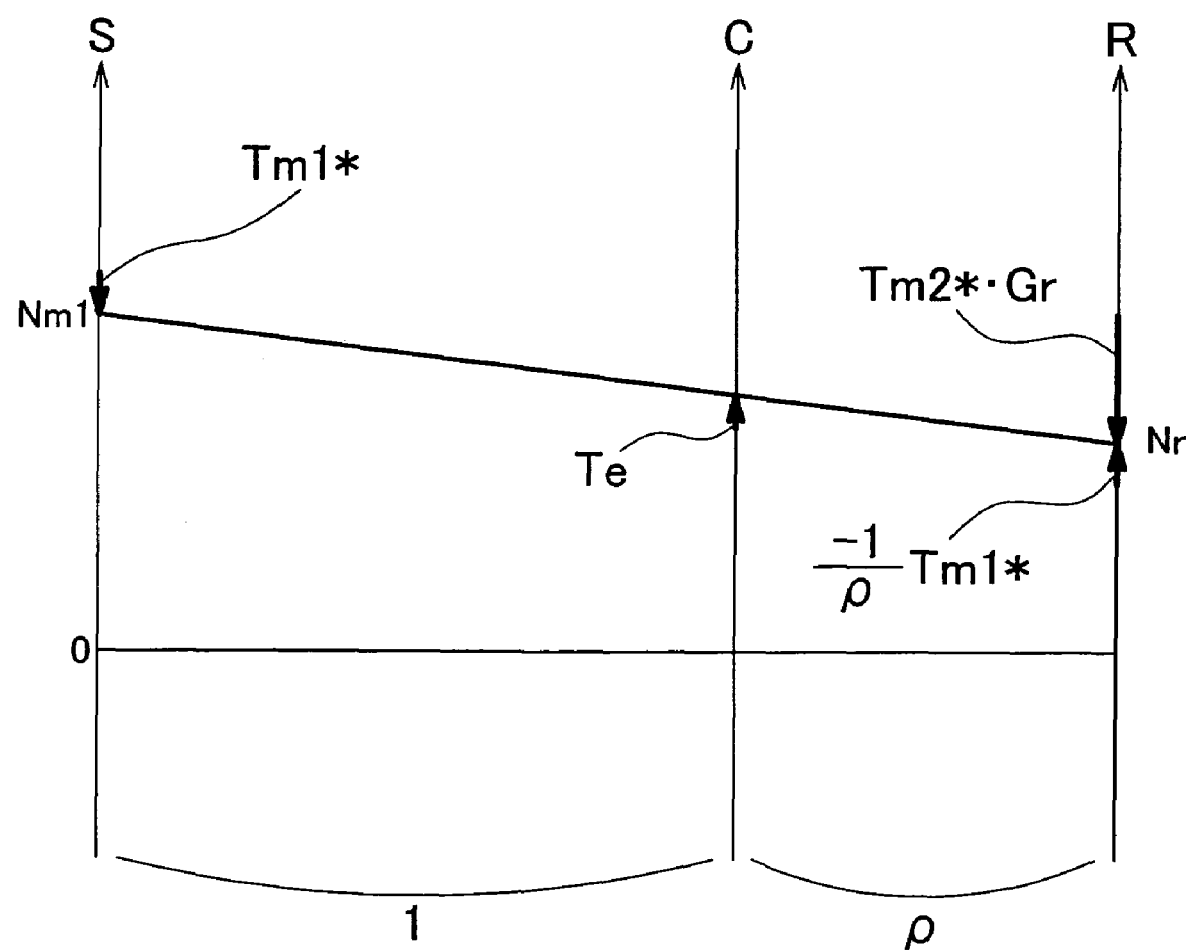
FIG. 7 is a view of another example of an alignment graph showing the mechanical relationship between torque and rotation speed of rotating elements of the power split device.

If it is determined in step S160 that the catalyst degradation suppression flag Fc is 1, i.e., if the catalyst bed temperature is in the predetermined high temperature region, then it is determined whether the vehicles speed V that was input is equal to or greater than the threshold value Vref (step S190). It is assumed now that the brake pedal 85 is being depressed after the accelerator pedal 83 was released while the vehicle speed V is relatively large. Therefore, immediately after this routine starts, the vehicle speed is equal to or greater than the threshold value Vref so the CPU 72 outputs a command to the engine ECU 24 to execute control to continue firing the engine 22 in order to suppress degradation of the catalyst (step S200). Then, the torque command Tm1* of the motor MG1 is set according to Expression (3) below so that the engine speed Ne reaches the target engine speed Ne* while the engine continues to fire (step S210). Then the CPU 72 sets the torque command Tm2* of the motor MG2 using the torque command Tm1* of the motor MG1 that was set (steps S260 to S280) and outputs the set torque commands Tm1* and Tm2* to the motor ECU 24 (step S290), after which this cycle of the routine ends. More specifically, the engine 22 is kept firing in this case by the hybrid ECU 70 outputting a control signal to the engine ECU 24. Upon receiving this control signal, the engine ECU 24 performs fuel injection control and ignition control. The fuel injection control performed at this time is such that slightly more fuel is injected than is injected when the engine 22 is made to idle at that engine speed Ne. Accordingly, a small amount of torque is output from the engine 22. Expression (3) is a relational expression in feedback control for bringing the engine speed Ne to the target engine speed Ne* when the engine 22 continues to fire. "k1" in the first term on the right side is the gain of a proportional term and "k2" in the second term on the right side is the gain of an integral term. FIG. 7 shows one example of an alignment graph showing the mechanical relationship between torque and rotation speed of rotating elements of the power split device at this time. In this way, the engine speed Ne is made to reach the target engine speed Ne* by drive control of the motor MG1 while the engine 22 continues to fire so the engine speed Ne can quickly be brought down to the target engine speed Ne*. Incidentally, in this state, a small amount of torque is output from the engine 22 so a corresponding amount of torque is applied to the ring gear shaft 32a and torque that cancels out that torque is added by the motor MG2 to the required braking torque Tr*.

$$Tm1^*=k1 \times \Delta N + k2 \int \Delta N \times dt \quad (3)$$

If it is determined that the vehicle speed V is gradually decreasing while the control to suppress catalyst degradation continues to be executed and the vehicle speed V is less than the threshold value Vref in step S190, the CPU 72 then outputs a command to the engine ECU 24 to execute a fuel cut (step S170) and sets the torque command Tm1* of the motor MG1 to 0 (step S180). This threshold value Vref is set lower the higher the catalyst bed temperature CT (see FIG. 5), as described above. That is, a high catalyst bed temperature CT tends to promote degradation of the catalyst of the exhaust gas control apparatus 134 more than does a low catalyst bed temperature CT so the control to suppress catalyst degradation is continued for as long as possible the higher the catalyst bed temperature CT. Thereafter, the CPU 72 sets the torque command Tm2* using the set torque command Tm1* of the motor MG1 (steps S260 to S280) and outputs the set torque commands Tm1* and Tm2* to the motor ECU 40, after which this cycle of the routine ends.

If it is determined in step S150 that the engine speed difference ΔN between the engine speed Ne that was input and the target engine speed Ne* that was set is equal to or less than the threshold value Nref, the target engine speed Ne* is checked (step S220). If the target engine speed Ne* is not 0, the hybrid ECU 70 outputs a command to the engine ECU 24 to operate the engine 22 in an idle state without outputting any torque at the target engine speed Ne* (step S230). If the target engine speed Ne* is 0, then the hybrid ECU 70 outputs a command to the engine ECU 24 to stop the engine 22 (step S240). Then, the torque command Tm1* of the motor MG1 is set to 0 (step S250) and the torque command Tm2* of the motor MG2 is set using that set torque command Tm1* of the motor MG1 (steps S260 to 280). The hybrid ECU 70 then outputs the set torque commands Tm1* and Tm2* to the motor ECU 40 (step S290), after which this cycle of the routine ends.

Here, let us assume a case in which the vehicle is running under a low load with the accelerator pedal 83 being depressed when the vehicle speed is low (such as 5 km/h or 10 km/h) due to the fact that the control routine during braking shown in FIGS. 3A, 3B is being executed. At this time, unless control to suppress catalyst degradation is being executed, a fuel cut would be executed and the engine 22 stopped as a result of the routine in FIGS. 3A, 3B being executed. Then, on a condition that another condition, such as an SOC condition, is satisfied, the vehicle would run only under the power of the motor MG2 while the engine 22 remains stopped. On the other hand, if control to suppress catalyst degradation is being executed during braking, it is conceivable that a fuel cut may be prohibited and the engine 22 kept operating (firing) in order to suppress catalyst degradation. However, if a fuel cut is always prohibited when control to suppress catalyst degradation is being executed, regardless of the vehicle speed, the engine 22 may operate in the low vehicle speed region (the first low vehicle speed region in this example embodiment) which is less than the EV running allowable vehicle speed Vev at which operation of the engine 22 should normally be stopped, thus giving the driver an odd feeling. Therefore, in the control routine during braking in FIGS. 3A, 3B, the engine 22 is stopped (i.e., shutoff) in a low vehicle speed region which is less than the EV running allowable vehicle speed Vev when the vehicle speed V reaches a low vehicle speed region (the second low vehicle speed region in this example embodiment) which is less than the threshold value Vref corresponding to the catalyst bed temperature CT. As a result, the engine 22 can be stopped as much as possible when there is a shift from braking to running under a light load. Also, the threshold value Vref is set lower when the catalyst bed temperature CT is high than it is when the catalyst bed temperature CT is low so the control to suppress catalyst degradation is continued for a longer period the higher the catalyst bed temperature CT. Therefore, degradation of the catalyst is avoided as much as possible when the vehicle speed is less than the threshold value Vref, even if a fuel cut is performed.

Here, the exhaust gas control apparatus 134 of the hybrid vehicle 20 according to this example embodiment may be regarded as an exhaust gas control catalyst, the fuel injection valve 126 may be regarded as a fuel injecting apparatus, and the hybrid ECU 70 and the engine ECU 24 may be regarded as a controlling apparatus. Also, the motor MG1 and the power split device 30 may be regarded as an electric power/ power inputting/outputting apparatus, the motor MG2 may be regarded as an electric motor, and the battery 50 may be regarded as a power storing apparatus. Here, the description of the operation of the hybrid vehicle 20 clearly illustrates an example embodiment of a vehicle according to the invention, and also clearly illustrates an example embodiment of a control method of a vehicle according to the invention.

According to the foregoing hybrid vehicle 20 of the example embodiment as described above, when the vehicle speed V is greater than the threshold value Vref when the engine speed difference ΔN between the engine speed Ne that was input and the target engine speed Ne* that was set is greater than the threshold value Nref and the catalyst degradation flag Fc is set to 1, that engine speed Ne is brought to the target engine speed Ne* while the engine 22 is firing. On the other hand, when the vehicle speed V is less than the threshold value Vref, a fuel cut is executed even if the engine speed difference ΔN between the engine speed Ne that was input and the target engine speed Ne* that was set is greater than the threshold value Nref and the catalyst degradation flag Fc is set to 1. At this time, the threshold value Vref is set based on the catalyst bed temperature CT so the control to suppress catalyst degradation can be continued as long as possible the more the operating state is such that the catalyst bed temperature CT is high and degradation of the catalyst is promoted. Therefore, the odd sensation imparted on the user can be reduced and catalyst degradation can be avoided as much as possible.

Also, the threshold value Vref is set lower the higher the catalyst bed temperature CT so degradation of the catalyst can be avoided as much as possible even if a fuel cut is executed when it is necessary to executed to suppress catalyst degradation.

Figure 8:
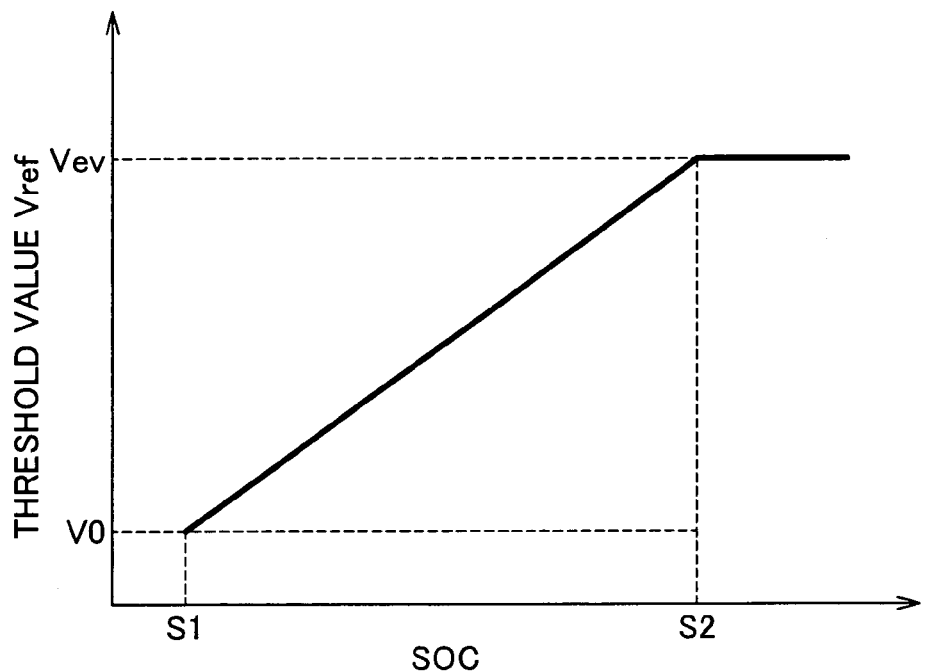
FIG. 8 is a view illustrating another example of a map used for setting a threshold.

In the hybrid vehicle 20 of this example embodiment, a map for setting the threshold value is created based on the catalyst bed temperature CT. Alternatively, however, the map for setting the threshold value may be created based on the SOC of the battery 50. FIG. 8 shows one example of a map for setting a threshold value which shows the relationship between the SOC and the threshold value Vref. In the map in FIG. 8, the threshold value Vref is set to a minimum value V0 at SOC 51, then increase toward SOC S2 which is greater than SOC S1, and is a maximum value Vev at SOC S2 and above. Here, the SOC S1 is a value set based on the minimum power necessary to move the vehicle. Also, the SOC S2 is the lower limit of the SOC range in which the SOC is determined to be good even when power has been consumed by cranking the engine 22. For example, let us assume a case in which the accelerator pedal 83 is being depressed and the vehicle is accelerating during braking due to the execution of this routine. In this case, if the engine 22 is already stopped, power must be supplied from the battery 50 to the motor MG1 to crank the engine 22 in order to restart it. At this time, because it is more important to minimize the battery power consumed when the SOC is low than when it is high, it is preferable to keep the engine 22 operating (i.e., firing) for as long as possible the lower the SOC. Therefore, when the SOC is low, the threshold value Vref is set to a lower value than it is when the SOC is high. In this case as well, the same effects can be obtained as those obtained with the foregoing example embodiment.

Figure 9:
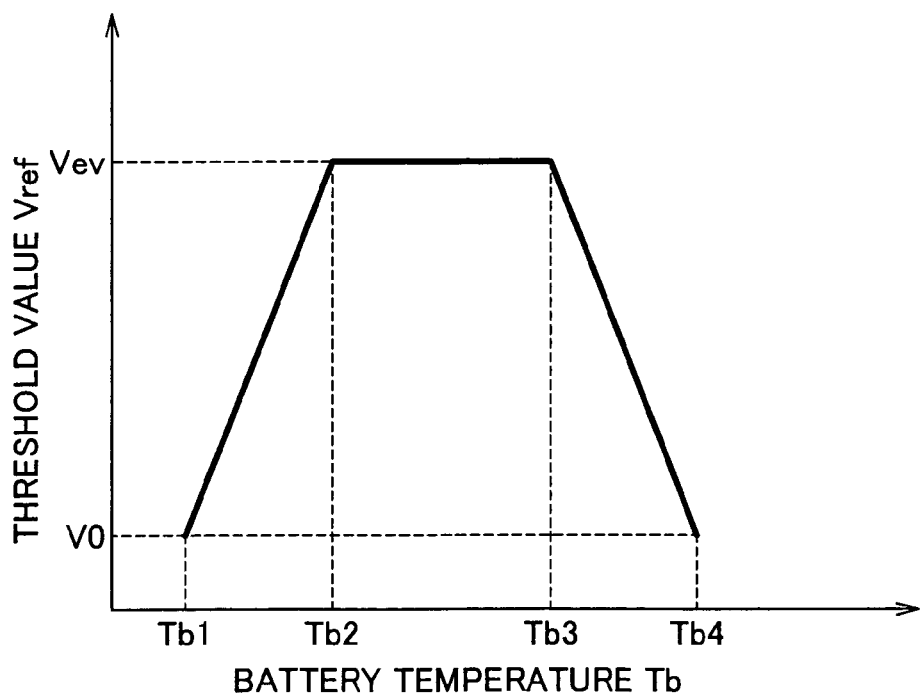
FIG. 9 is a view illustrating yet another example of a map used for setting a threshold.
Figure 10:
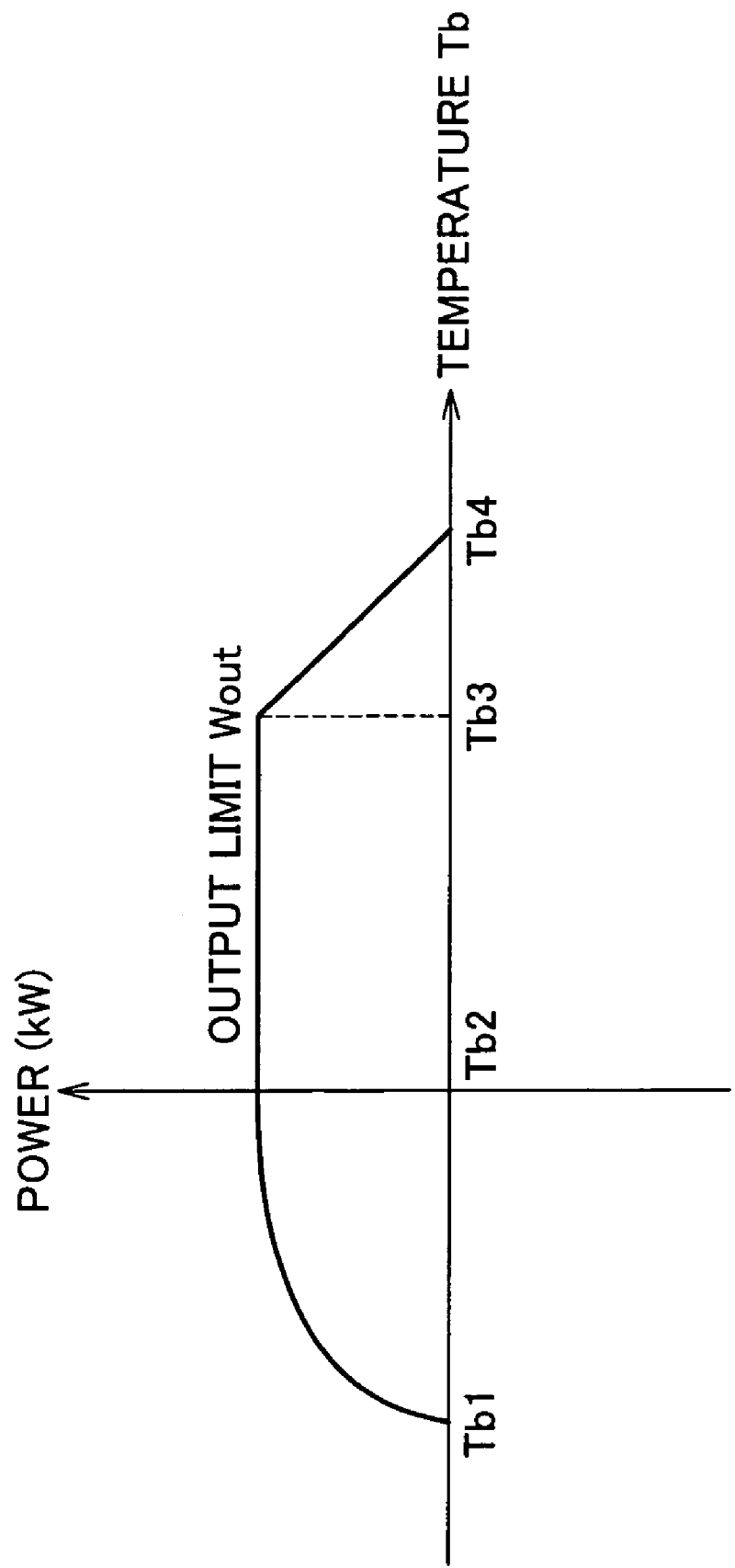
FIG. 10 is a graph showing one example of the relationship between battery temperature Tb and an output limit Wout.

In the hybrid vehicle 20 according to the foregoing example embodiment, a map for setting the threshold value is created based on the catalyst bed temperature CT. Alternatively, however, the map for setting the threshold may be created based on the battery temperature Tb. FIG. 9 shows one example of a map for setting the threshold value which shows the relationship between the threshold value Vref and the battery temperature Tb, while FIG. 10 shows an example of the relationship between the output limit Wout and the battery temperature Tb of the battery 50. In the map in FIG. 9, the threshold value Vref is set to be a minimum value V0 at temperature Tb1, then increase toward temperature Tb2 which is greater than temperature Tb1, reach and remain at a maximum value Vev from temperature Tb2 to temperature Tb3, then decrease from temperature Tb3 toward temperature Tb4 and is a minimum value V0 at temperature Tb4. Also, in FIG. 10, the output limit Wout is set to be 0 at temperature Tb1, then increase from temperature Tb1 toward temperature Tb2, be constant at a maximum value from temperature Tb2 to temperature Tb3 then decrease from temperature Tb3 to temperature Tb4, and be 0 at temperature Tb4. That is, as can be understood from FIGS. 9 and 10, the threshold value Vref is set smaller at battery temperatures Tb in which the value of the output limit Wout is small. For example, let us assume a case in which the accelerator pedal 83 is being depressed and the vehicle is accelerating during braking as a result of the execution of this routine. In this case, if the engine 22 is already stopped, power must be supplied from the battery 50 to the motor MG1 to crank the engine 22 in order to restart it. Accordingly, the threshold value Vref is set smaller with battery temperatures Tb in which the value of the output limit Wout is low and the engine 22 is kept operating (i.e., firing) as long as possible. In this case as well, the same effects can be obtained as those obtained with the foregoing example embodiment.

In the hybrid vehicle 20 according to the foregoing example embodiment, when creating the map for setting the threshold, the map is created so that the threshold value Vref continuously decreases as the catalyst bed temperature CT increases between temperature CT1 and temperature CT2, and is then constant at temperature CT2 or higher. The invention is not limited to this however. For example, a map may also be created in which the threshold value Vref continuously decreases at temperature CT1 or higher, or a map may be created in which the threshold value Vref decreases in a stepped manner as the catalyst bed temperature CT increases.

Figure 11:
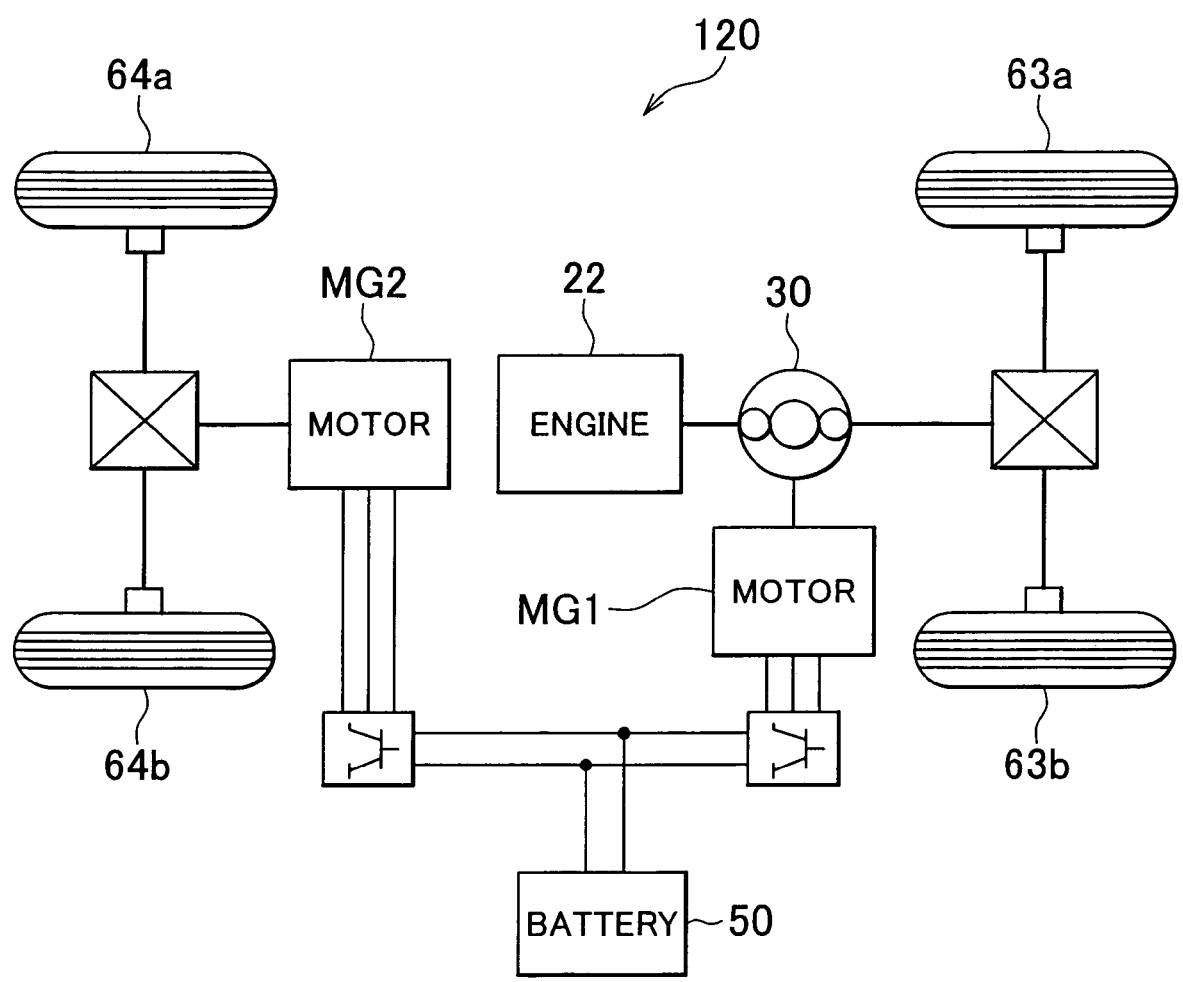
FIG. 11 is a block diagram schematically showing the structure of a hybrid vehicle according to a modified example of the example embodiment.

In the hybrid vehicle 20 according to the foregoing example embodiment, the power of the motor MG2 is changed and output to the ring gear shaft 32*a* by the reduction gear 35. Alternatively, however, as illustrated in a hybrid vehicle 120 according to a modified example shown in FIG. 11, the power of the motor MG2 may be transmitted to axles (i.e., axles to which wheels 64*a* and 64*b* are connected in FIG. 11) other than the axles (i.e., the axles to which the driven wheels 63*a* and 63*b* are connected) to which the ring gear shaft 32*a* is connected.

Figure 12:
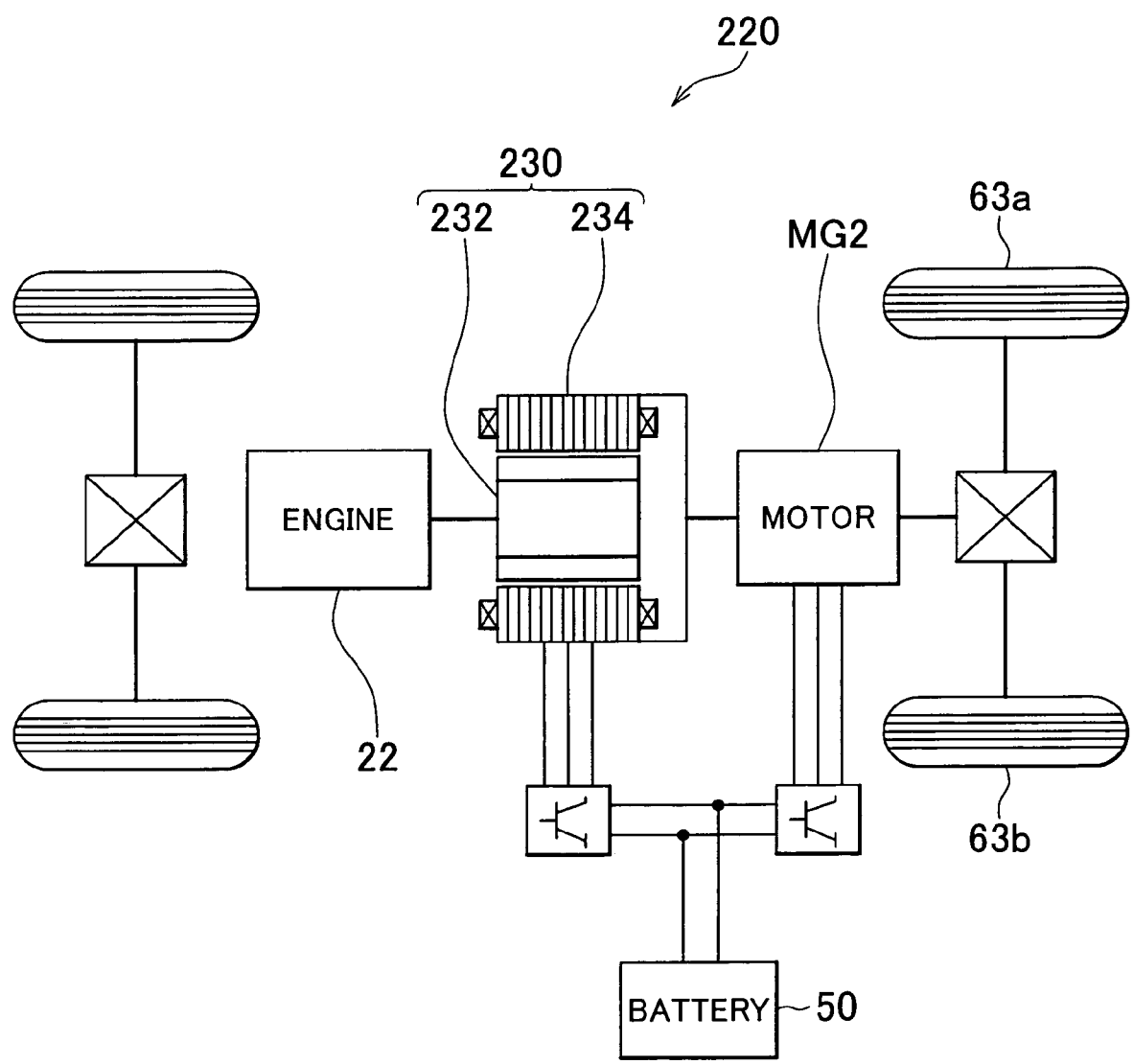
FIG. 12 is a block diagram schematically showing the structure of a hybrid vehicle according to another modified example of the example embodiment.

The hybrid vehicle 20 according to the foregoing example embodiment outputs power from the engine 22 via the power split device 30 to the ring gear shaft 32*a* which serves as the driveshaft that is connected to the driven wheels 63*a* and 63*b*. However, as illustrated by a hybrid vehicle 220 according to a modified example shown in FIG. 12, a dual rotor electric motor 230 may also be provided which has an inner rotor 232 connected to the crankshaft 26 of the engine 22 and an outer rotor 234 connected to the driveshaft that outputs power to the driven wheels 63*a* and 63*b*. Accordingly, the dual rotor electric motor 230 both transmits some of the power from the engine 22 to the driveshaft and converts the remaining power to electric energy.

In the foregoing example embodiment, the invention was described with respect to the hybrid vehicle 20 but it is not limited to this type of hybrid vehicle 20. That is, the invention may also be applied to an engine vehicle with an idling stop function, which is driven by an engine 22 that has an idling stop function. In this case, for example, if the threshold value Vref is substantially 0, the engine 22 can be made to stop (shutoff) when the vehicle is stopped, regardless of whether control to suppress catalyst degradation is being executed. Furthermore, the invention may also be applied to a vehicle other than an automobile, such as a train or a marine vessel or the like.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control method of a vehicle including an internal combustion engine, an exhaust gas control catalyst that purifies exhaust gas discharged from the internal combustion engine, fuel injecting means for injecting fuel into the internal combustion engine, vehicle speed detecting means for detecting a vehicle speed, and automatic shutting off means for shutting off the internal combustion engine when the vehicle speed detected by the vehicle speed detecting means is in a first low vehicle speed region, an electric power/power input/output apparatus which is connected to a driveshaft and an output shaft of the internal combustion engine, and outputs at least some power from the internal combustion engine to the driveshaft with input/output of power and electric power, an electric motor that selectively inputs and outputs power to and from the driveshaft, and a power storing device that selectively supplies and receives electric power to and from the electric power/power input/output apparatus and the electric motor, the control method comprising the steps of:
i) when a predetermined catalyst degradation condition is satisfied when a predetermined fuel cut condition is satisfied, executing control to suppress catalyst degradation that keeps the internal combustion engine firing without cutting off the injection of fuel by the fuel injecting means when the vehicle speed detected by the vehicle speed detecting means is outside of a second low vehicle speed region set based on an operating state of the vehicle, wherein a parameter relating to the operating state of the vehicle includes a state of the power storing device; and
ii) executing fuel cut control that stops the internal combustion engine from firing by cutting off the injection of fuel by the fuel injecting means when the vehicle speed detected by the vehicle speed detecting means is in the second low vehicle speed region while the control to suppress catalyst degradation is being executed.

2. A vehicle comprising:
a vehicle speed detecting device that detects a vehicle speed;
an automatic shutoff apparatus that shuts off an internal combustion engine when the vehicle speed is in a first low vehicle speed region;
an exhaust gas control catalyst that purifies exhaust gas discharged from the internal combustion engine;
a fuel injection apparatus that injects fuel into the internal combustion engine;
a control apparatus which, i) when a predetermined catalyst degradation condition is satisfied when a predetermined fuel cut condition is satisfied, executes control to suppress catalyst degradation that keeps the internal combustion engine firing without the fuel injection apparatus cutting off the injection of fuel when the vehicle speed detected by the vehicle speed detecting device is outside of a second low vehicle speed region set based on an operating state of the vehicle, and ii) executes fuel cut control that stops the internal combustion engine from firing by the fuel injection apparatus cutting off the injection of fuel when the vehicle speed detected by the vehicle speed detecting device is in the second low vehicle speed region while the control to suppress catalyst degradation is being executed; and
wherein a parameter relating to the operating state of the vehicle includes a temperature of the exhaust gas control catalyst and the control apparatus sets the second low vehicle speed region such that an upper limit value thereof decreases the higher the temperature of the exhaust gas control catalyst.

3. A vehicle comprising:
a vehicle speed detecting device that detects a vehicle speed;
an automatic shutoff apparatus that shuts off an internal combustion engine when the vehicle speed is in a first low vehicle speed region;
an exhaust gas control catalyst that purifies exhaust gas discharged from the internal combustion engine;
a fuel injection apparatus that injects fuel into the internal combustion engine;
a control apparatus which, i) when a predetermined catalyst degradation condition is satisfied when a predetermined fuel cut condition is satisfied, executes control to suppress catalyst degradation that keeps the internal combustion engine firing without the fuel injection apparatus cutting off the injection of fuel when the vehicle speed detected by the vehicle speed detecting device is outside of a second low vehicle speed region set based on an operating state of the vehicle, and ii) executes fuel cut control that stops the internal combustion engine from firing by the fuel injection apparatus cutting off the injection of fuel when the vehicle speed detected by the vehicle speed detecting device is in the second low vehicle speed region while the control to suppress catalyst degradation is being executed;
an electric power/power input/output apparatus which is connected to a driveshaft and an output shaft of the internal combustion engine, and outputs at least some power from the internal combustion engine to the driveshaft with input/output of power and electric power;
an electric motor that selectively inputs and outputs power to and from the driveshaft; and
a power storing device that selectively supplies and receives electric power to and from the electric power/power input/output apparatus and the electric motor,
wherein a parameter relating to the operating state of the vehicle includes a state of the power storing device.

4. The vehicle according to claim 3, wherein the state of the power storing device is a state-of-charge of the power storing device, and the control apparatus sets the second low vehicle speed region such that an upper limit value thereof decreases the lower the state-of-charge of the power storing device.

5. The vehicle according to claim 3, wherein the state of the power storing device is a temperature of the power storing device, and the control apparatus sets the second low vehicle speed region such that an upper limit value thereof decreases the more limited an electric power supply amount from the power storing device which is set according to the temperature of the power storing device.

6. The vehicle according to claim 3, wherein the electric power/power input/output apparatus includes i) a three-shaft power input/output apparatus which is connected to three shafts, one of which is a rotating shaft, another of which is the driveshaft, and yet another of which is an output shaft of the internal combustion engine, and, based on the power input/output to/from any two shafts of the three shafts, selectively inputs and outputs power to and from the remaining shaft; and ii) an electric motor that selectively inputs and outputs power to and from the rotating shaft.

7. The vehicle according to claim 3, wherein the parameter relating to the operating state of the vehicle includes a temperature of the exhaust gas control catalyst.

8. The vehicle according to claim 7, wherein the control apparatus sets the second low vehicle speed region such that an upper limit value thereof decreases the higher the temperature of the exhaust gas control catalyst.

\* \* \* \* \*